(12) United States Patent
Lee et al.

(10) Patent No.: US 11,367,442 B2
(45) Date of Patent: Jun. 21, 2022

(54) DEVICE AND METHOD WITH INPUT

(71) Applicant: Samsung Electronics Co., Ltd., Suwon-si (KR)

(72) Inventors: Sangsoo Lee, Seoul (KR); Hoshik Lee, Seongnam-si (KR); Junhwi Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 16/715,089

(22) Filed: Dec. 16, 2019

(65) Prior Publication Data

US 2021/0043201 A1    Feb. 11, 2021

(30) Foreign Application Priority Data

Aug. 5, 2019   (KR) .......................... 10-2019-0094871

(51) Int. Cl.
| | | |
|---|---|---|
| G10L 15/22 | (2006.01) | |
| G06T 7/70 | (2017.01) | |
| H04M 1/724 | (2021.01) | |
| G06F 3/16 | (2006.01) | |
| G10L 15/18 | (2013.01) | |

(52) U.S. Cl.
CPC .............. G10L 15/22 (2013.01); G06F 3/167 (2013.01); G06T 7/70 (2017.01); G10L 15/18 (2013.01); H04M 1/724 (2021.01); *G10L 2015/223* (2013.01)

(58) Field of Classification Search
CPC ... G10L 15/22; G10L 15/18; G10L 2015/223; G10L 15/26; G10L 2015/221; G06F 3/167; G06F 3/0233; G06F 3/0481; G06T 7/70; H04M 1/724
See application file for complete search history.

(56) References Cited

U.S. PATENT DOCUMENTS

| | | | |
|---|---|---|---|
| 7,822,699 B2 | 10/2010 | Katariya et al. | |
| 8,719,009 B2 | 5/2014 | Baldwin et al. | |
| 9,031,830 B2 | 5/2015 | Ballinger et al. | |
| 2004/0029085 A1* | 2/2004 | Hu ........................ | G06F 40/258 |
| | | | 434/178 |
| 2006/0111909 A1* | 5/2006 | Maes ...................... | H04L 41/00 |
| | | | 704/270 |

(Continued)

FOREIGN PATENT DOCUMENTS

| | | |
|---|---|---|
| EP | 2 653 964 A2 | 10/2013 |
| JP | 2018-72508 A | 5/2018 |

(Continued)

OTHER PUBLICATIONS

Extended European Search Report dated Sep. 25, 2020 in counterpart European Patent Application No. 20168189.7 (7 pages in English).

*Primary Examiner* — Stella L. Woo
(74) *Attorney, Agent, or Firm* — NSIP Law (57) ABSTRACT

A processor-implemented electronic device input method includes: identifying input items configured to receive information on a displayed screen, by performing either one or both of a layout analysis and an image analysis with respect to the screen; tagging one of the input items with a text token extracted from a speech recognition result of a speech signal; and inputting the tagged text token into the one of the input items.

27 Claims, 8 Drawing Sheets

(56) References Cited

U.S. PATENT DOCUMENTS

| | | | |
|---|---|---|---|
| 2013/0041670 A1 | 2/2013 | Morgan et al. | |
| 2013/0238312 A1* | 9/2013 | Waibel | G10L 15/1815 |
| | | | 704/8 |
| 2013/0282381 A1* | 10/2013 | Mauro | G10L 15/26 |
| | | | 704/275 |
| 2014/0279729 A1* | 9/2014 | Delaney | G06N 20/00 |
| | | | 706/12 |
| 2015/0067609 A1* | 3/2015 | Moon | G06F 3/04817 |
| | | | 715/835 |
| 2015/0149168 A1* | 5/2015 | Stent | G10L 15/26 |
| | | | 704/235 |
| 2015/0234822 A1 | 8/2015 | Gargalhone et al. | |
| 2016/0034253 A1* | 2/2016 | Bang | G06F 9/451 |
| | | | 715/728 |
| 2016/0098521 A1* | 4/2016 | Koziol | G10L 15/22 |
| | | | 704/270.1 |

FOREIGN PATENT DOCUMENTS

| | | |
|---|---|---|
| KR | 10-1427040 B1 | 8/2014 |
| WO | WO 2017/201041 A1 | 11/2017 |

* cited by examiner

The name is ○○○, the phone number is △ △ △ , and the address is ☐☐☐.
⎵    ⎵   ⎵    ⎵    ⎵    ⎵
410   420   430   440   450   460

FIG. 5

The first one is ○○○, the right of that is △ △ △ , and the one under that is ☐☐☐.
510   520   530   540   550   560

FIG. 6

○○○, and △ △ △ , and ☐☐☐.
610   620   630

DEVICE AND METHOD WITH INPUT

CROSS-RELATED TO RELATED APPLICATIONS

This application claims the benefit under 35 USC § 119(a) of Korean Patent Application No. 10-2019-0094871 filed on Aug. 5, 2019 in the Korean Intellectual Property Office, the entire disclosure of which is incorporated herein by reference for all purposes.

BACKGROUND

1. Field

The following description relates to an apparatus and method with input.

2. Description of Related Art

Various services are available on smart phones. However, a typical smart phone is incapable of receiving or processing, as an input, an amount of information above a certain threshold.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented electronic device input method includes: identifying input items configured to receive information on a displayed screen, by performing either one or both of a layout analysis and an image analysis with respect to the screen; tagging one of the input items with a text token extracted from a speech recognition result of a speech signal; and inputting the tagged text token into the one of the input items.

The layout analysis may be performed based on a user interface (UI) layout file defining the input items on the displayed screen.

The UI layout file may be a file accessible at a platform level, and the file may define any one or any combination of any two or more of: positions, an order, value types, and object types of the input items included in the screen at a code level.

The image analysis may be performed with respect to relative positions among the input items in the displayed screen.

The tagging may include extracting the text token from the speech recognition result and tagging the one of the input items with the extracted text token, based on any one or any combination of any two or more of: whether the one of the input items is mentioned in the speech recognition result; whether an expression indicating the one of the input items is to be filled in by the user is included in the speech recognition result; and any one or any combination of any two or more of content, a type, and an order of the speech recognition result.

The tagging may include, in response to the speech recognition result mentioning the one of the input items: extracting, from the speech recognition result, one or more words following the one of the input items as the text token; and tagging the one of the input items with the extracted text token.

The tagging may include, in response to the speech recognition result including an expression related to the one of the input items: extracting, from the speech recognition result, one or more words following the expression as the text token; and tagging the one of the input items with the extracted text token.

The expression related to the one of the input items may include either one or both of an expression indicating the one of the input items and an expression mentioning information previously input into the one of the input items.

The tagging may include: identifying, as the one of the input items, an input item corresponding to any one or any combination of any two or more of content, types, and an order of one or more words included in the speech recognition result; and tagging the one of the input items with the text token, the text token including the one or more words.

The inputting may include, in response to a format of the text token not corresponding to a format of the one of the input items, converting the text token to the format of the one of the input items and inputting the text token into the one of the input items.

The method may include displaying the speech recognition result on the screen.

One or more words extracted as the text token from the speech recognition result may be displayed on the screen in a format visually different than a format of the displayed speech recognition result.

The method may include receiving an instruction to call a speech recognition from a user, wherein the speech signal is of the user.

A non-transitory computer-readable storage medium may store instructions that, when executed by one or more processors, configure the one or more processors to perform the method.

In another general aspect, an electronic device includes: one or more processors configured to: identify input items configured to receive information on a displayed screen, by performing either one or both of a layout analysis and an image analysis with respect to the screen, tag one of the input items with a text token extracted from a speech recognition result of a speech signal, and input the tagged text token into the one of the input items.

The one or more processors may be configured to extract the text token from the speech recognition result and tag the one of the input items with the extracted text token, based on any one or any combination of any two or more of: whether the one of the input items is mentioned in the speech recognition result; whether an expression indicating the one of the input items is to be filled in by the user is included in the speech recognition result; and any one or any combination of any two or more of content, a type, and an order of the speech recognition result.

The one or more processors may be configured to, in response to the speech recognition result mentioning one of the input items: extract, from the speech recognition result, one or more words following the one of the input items as the text token; and tag the one of the input items with the extracted text token.

The one or more processors may be configured to, in response to the speech recognition result including an expression related to the one of the input items: extract, from the speech recognition result, one or more words following the expression as the text token, and tag the one of the input items with the extracted text token.

The one or more processors may be configured to: identify, as the one of the input items, an input item corresponding to any one or any combination of any two or more of content, types, and an order of one or more words included in the speech recognition result; and tag the one of the input items with the text token, the text token including the one or more words.

The layout analysis may be performed based on a user interface (UI) layout file defining the input items on the displayed screen.

The device may be any one or any combination of any two or more of a mobile phone, a smart phone, a personal digital assistant (PDA), a tablet computer, a laptop computer, a personal computer (PC), a tablet computer, and a netbook.

The apparatus may include a memory storing instructions that, when executed by the one or more processors, configure the one or more processors to perform the identifying of the input items, the tagging of the one of the input items, and the inputting of the tagged text token.

In another general aspect, a processor-implemented electronic device input method includes: identifying an input item configured to receive input information in a user interface display; tagging the input item with a corresponding text token of a speech recognition result; and inputting the tagged text token into the input item.

The identifying may include identifying a plurality of input items configured to receive input information in the user interface display, the tagging may include tagging each of the plurality of input items with a corresponding text token from among a plurality of text tokens of the speech recognition result, and the inputting may include inputting each of the tagged text tokens into the respectively corresponding input items.

The identifying of the input item may include identifying a category of the input information to be received by the input item, and the tagging of the input item may include tagging the input item with the text token in response to determining that an expression of the speech recognition result adjacent to the text token corresponds to the category of the input information to be received by the input item.

The identifying of the input item may include identifying either one or both of a hierarchical order and a directional position of the input item with respect to another item of the user interface display, and the tagging of the input item may include tagging the input item with the text token in response to determining that an expression of the speech recognition result adjacent to the text token corresponds to the either one or both of the hierarchical order and the directional position.

The identifying of the input item may include identifying an input format of the input item, and the tagging of the input item may include tagging the input item with the text token in response to determining that a format of the text token corresponds to the input format of the input item.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It should be noted that if it is described that one component is "connected", "coupled", or "joined" to another component, a third component may be "connected", "coupled", and "joined" between the first and second components, although the first component may be directly connected, coupled, or joined to the second component.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Hereinafter, examples are described in detail with reference to the accompanying drawings. The following specific structural or functional descriptions are exemplary to merely describe the examples, and the scope of the examples is not limited to the descriptions provided in the present specification. Various changes and modifications can be made thereto by those of ordinary skill in the art based on an understanding of the disclosure of the present application. Like reference numerals in the drawings denote like elements, and a known function or configuration will be omitted herein.

Figure 1:
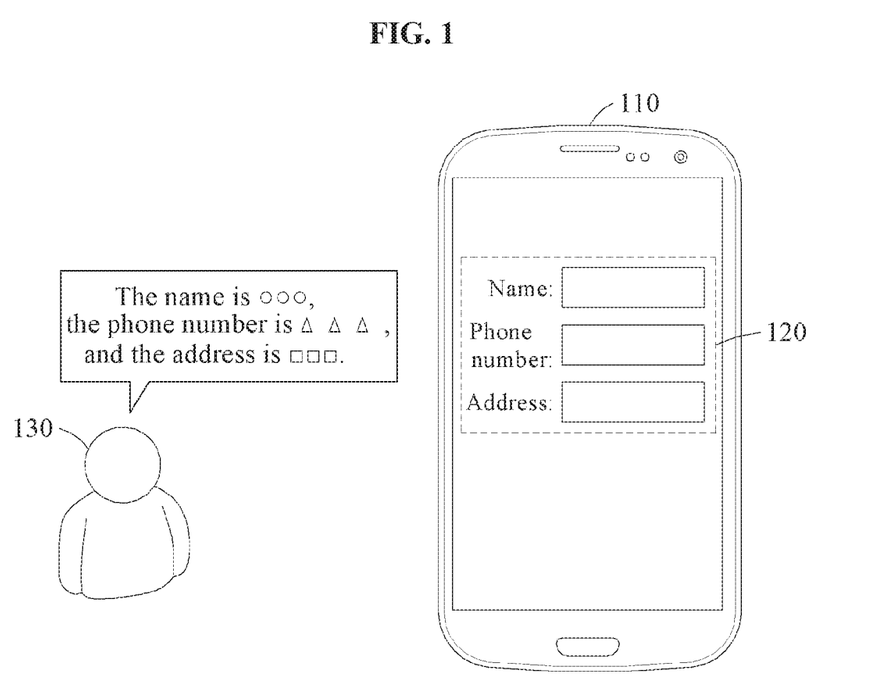
FIGS. 1 and 2 illustrate examples of inputting information into input items with speech.
Figure 2:
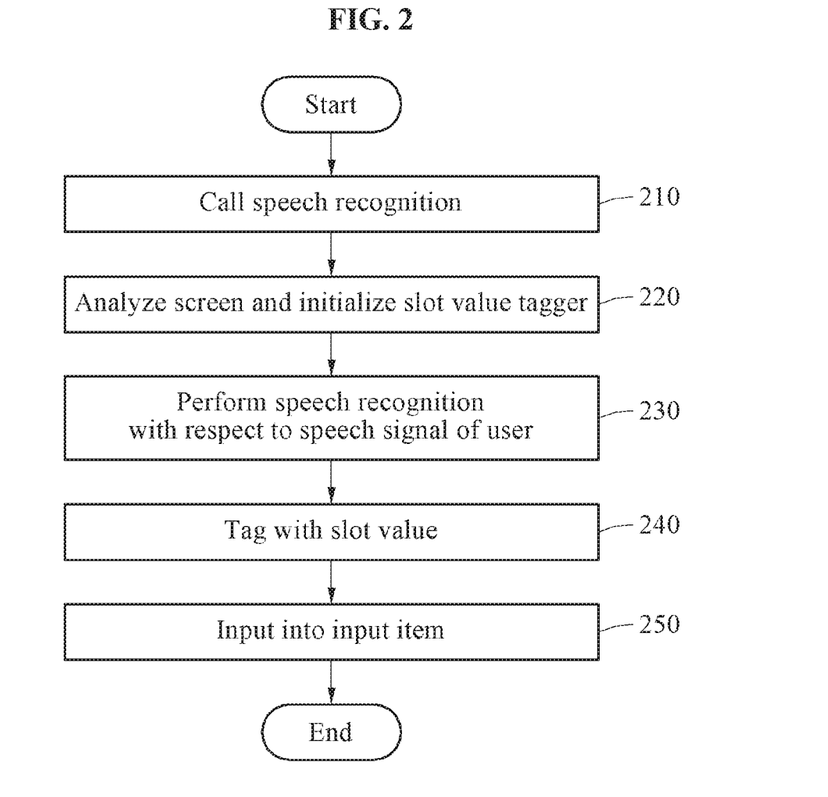

FIGS. 1 and 2 illustrate examples of inputting information into input items with speech.

Referring to FIG. 1, information may be input into input items with speech.

An electronic device 110 may display a plurality of input items 120 to be filled in with information by a user 130 on a screen. The user 130 may input information into the plurality of input items 120 using a keyboard displayed on the electronic device 110. In a typical electronic device, however, the user 130 may need to select an input item to be filled in and type every information to be input. Such a series of tasks may be inconvenient to the user 130, and it may take a long time to input information. In contrast, in the electronic device 110 of the present application, the user 130 may input a variety of information into the input items 120 with speech, thereby avoiding the inconvenience of typing and significantly reducing the time for input.

The electronic device 110 may identify a plurality of input items 120 to be filled in with information by analyzing the currently displayed screen, and receive a speech signal of "The name is ○○○, the phone number is ΔΔΔ, and the address is □□□" from the user 130. The electronic device 110 may perform a speech recognition on the speech signal of "The name is ○○○, the phone number is ΔΔΔ, and the address is □□□" and obtain sentence data of "The name is ○○○, the phone number is ΔΔΔ, and the address is □□□" as a speech recognition result. The electronic device 110 may input one or more text tokens extracted from the speech recognition result into the plurality of input items 120. Here, a text token refers to one or more words extracted from the speech recognition result so as to be input into an input item. In the above example, "○○○", "ΔΔΔ", and "□□□" may be extracted respectively as text tokens. In this manner, the electronic device 110 may advantageously provide an intuitive and practical user experience (UX) which enables the user 130 to easily input the variety of information included in the speech signal of the user 130 all at once into the plurality of input items 120 based on natural language processing (NLP) and foreground application view analysis.

In an example, some or all operations may be performed by the electronic device 110 owned and directly controlled by the user 130. However, in some other examples, the electronic device 110 may transfer the speech signal of the user 130 to a separate server connected to the electronic device 110 via a communication network, and input information into an input item by receiving a result of processing performed by the server. In examples described herein, operations may be performed by either one or both of the electronic device 110 and by the separate server.

Referring to FIG. 2, an operation method of an electronic device may include operations of inputting information into input items with speech.

In operation 210, an electronic device may call a speech recognition based on an instruction input from a user. For example, the user may instruct the electronic device to call the speech recognition by selecting a predetermined button or by uttering a predetermined keyword like "Hi Bixby".

In operation 220, the electronic device may analyze a displayed screen and initializes a slot value tagger. The electronic device may identify input items to be filled in on the screen by performing a layout analysis and an image analysis with respect to the displayed screen, examples of which will be described further below with reference to FIG. 3.

In operation 230, the electronic device may perform the speech recognition with respect to a speech signal of the user. The speech signal uttered by the user may be converted into sentence data through the speech recognition and obtained as a speech recognition result.

In operation 240, the electronic device may tag one of the input items with a text token extracted from the speech recognition result. The electronic device may extract a text token including information to be input by the user from the speech recognition result, and tag an input item corresponding to the extracted text token with the corresponding text token. In an example of FIG. 1, tagging with respect to text tokens may be performed as "○○○/name", "ΔΔΔ/phone number", and "□□□/address".

As described above, the electronic device may tag one of the input items with the text token extracted from the speech recognition result based on NLP. In an example, the electronic device may use slot value determination, while excluding domain determination or intent determination, in NLP. That is, the electronic device may extract a meaningful word as the text token from the speech recognition result and tag an input item with the text token, irrespective of functional purpose or intent. The electronic device may use the slot value determination of NLP to input information into the input items displayed on the screen.

In operation 250, the electronic device may input the tagged text token into the corresponding input item. For example, the electronic device may input "○○○" into an input item "name", "ΔΔΔ" into an input item "phone number", and "□□□" into an input item "address", based on a tagging result (for example, "○○○/name", "ΔΔΔ/phone number", "□□□/address").

Figure 3:
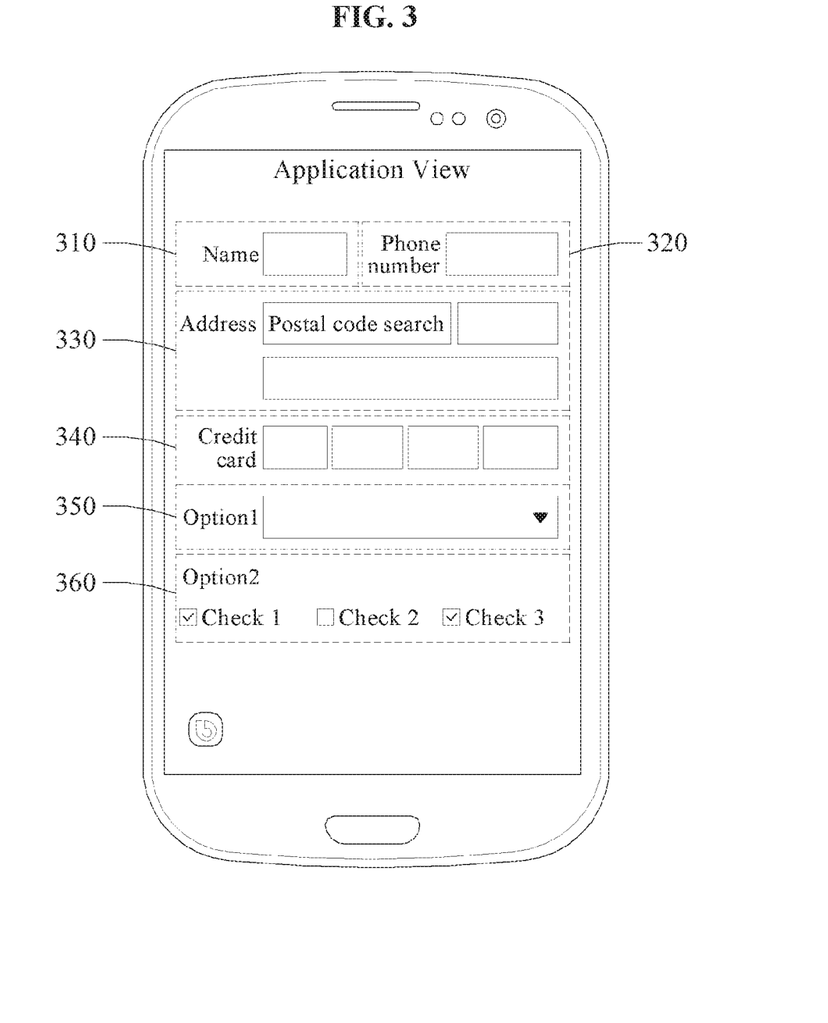
FIG. 3 illustrates an example of analyzing a screen of an electronic device.

FIG. 3 illustrates an example of analyzing a screen of an electronic device.

Referring to FIG. 3, a plurality of input items 310 through 360 may be included in a screen.

An electronic device may perform a layout analysis with respect to the displayed screen. The screen may be configured based on prewritten program codes, and the program codes may define sizes, value types, object types, and positions of input items. A file configuring the displayed screen may be referred to as a user interface (UI) layout file, and the layout analysis may be performed based on the UI layout file defining the input items included in the displayed screen.

The UI layout file may be a file accessible at a platform (for example, Android) level, and the file may define any one or any combination of positions, an order, value types, and object types of the input items included in the screen at a code level.

The positions of the input items may include absolute positions of the input items and/or relative positions among the input items. For example, the UI layout file may define an input item "name" 310 as being on the left of an input item "phone number" 320 and above an input item "address" 330.

The order of the input items may be a general order in which information is input into the input items (for example, an order from left to right and/or an order from top to bottom). For example, the UI layout file may define the input item "name" 310 as being ahead of the input item "phone number" 320 and the input item "address" 330.

Values of the input items may be associated with enumeration of letters (for example, the Korean alphabet (Hangul) or the English alphabet), numbers, and/or signs present in the form of text on the screen displayed in the electronic device. The value types of the input items may be condition definitions with respect to the form (or format) of the values. For example, the value types may be conditions such as a letter-number combination, and the maximum or minimum length of a value. In an example of FIG. 3, the UI layout file may define a value type of the input item "name" 310 as letters, a value type of the input item "phone number" 320 as a number including up to n digits, a value type of the input item "address" 330 as a letter-number combination, and a value type of an input item "credit card" 340 as numbers. A value type of an input item may be applied as constraints for information to be input into the corresponding item.

The object types of the input items may be types of screen elements displayed in the electronic device and include, for example, a text field which is a region for outputting text, an input field for inputting information, a list box for selecting one from a predetermined list, and/or a checkbox for selecting one or more from a predetermined list. For example, the UI layout file may define an object type of the input item "name" 310 as an input field, an object type of an input item "Option1" 350 as a list box, and an object type of an input item "Option2" 360 as a checkbox.

An input item to be filled in by a user may be identified in view of a value type and an object type of the input item, examples of which will be described further below. For example, the input item "Option1" may be is a list box related to "languages" and have a list including 1: Korean, 2: English. When the user utters "Select Korean from the language list", an input item to be filled in may be identified by recognizing an object type corresponding to "list" and a value type corresponding to "Korean". Further, an image and a button displayed in the electronic device may correspond to the object types. If there is a text displayed on the image or the button, the corresponding text may be regarded as a value type.

In addition, the electronic device may perform the image analysis with respect to the displayed screen. The electronic device may capture the displayed screen and identify the positions of the input items in the captured screen. For example, the electronic device may identify input boxes to be filled with information and checkboxes to be checked in the captured screen, identify relative positions among the input boxes and the checkboxes, and verify information to be input into each input box based on character reading technology (for example, optical character reader (OCR)).

As described above, the electronic device may verify the positions, the order, the value types, and the object types of the input items included in the screen through the layout analysis and the image analysis with respect to the screen, and thus determine words to be extracted as a text token from the speech recognition result.

Figure 4:
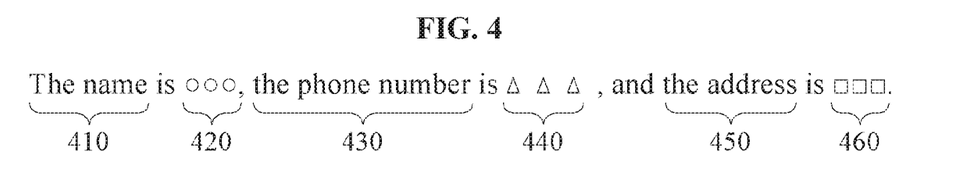
FIGS. 4 through 6 illustrate examples of tagging input items with text tokens.
Figure 5:
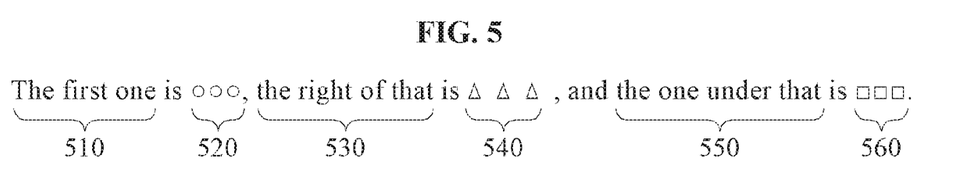
Figure 6:
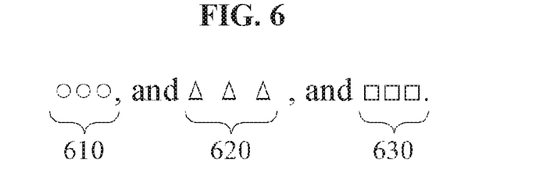

FIGS. 4 through 6 illustrate examples of tagging input items with text tokens.

Referring to FIG. 4, input items with text tokens may be tagged in response to a speech recognition result mentioning the input items.

In an example of FIG. 4, sentence data of "The name is ○○○, the phone number is ΔΔΔ, and the address is □□□" may be obtained as a speech recognition result to be used with the example screen analysis described above with reference to FIG. 3. The electronic device may verify that input items include a name, a phone number, and an address through the screen analysis described above, and verify that the input items are mentioned in the speech recognition result. In an example, the electronic device may extract one or more words following each input item mentioned in the speech recognition result, and tag the corresponding input item with the extracted text token.

For example, the electronic device may extract one or more words ○○○ 420 following "name" 410 as a text token from the speech recognition result, and tag an input item "name" (e.g., the input item "name" 310) with the text token. The electronic device may extract ○○○ 420 positioned between the "name" 410 and "phone number" 430 corresponding to input items as a text token. Further, the electronic device may extract one or more meaningful words ○○○ 420 to be input into an input item from the speech recognition result using a threshold value of a slot value tagger model. Likewise, the electronic device may extract ΔΔΔ440 following the "phone number" 430 from the speech recognition result and tag an input item "phone number" (e.g., the input item "phone number" 320) therewith, and extract □□□ 460 following "address" 450 from the speech recognition result and tag an input item "address" (e.g., the input item "address" 330) therewith.

Referring to FIG. 5, an input item to be filled in by a user with a text token may be tagged in response to a speech recognition result including an expression indicating the input item.

In an example of FIG. 5, sentence data of "The first one is ○○○, the right of that is ΔΔΔ, and the one under that is □□□" may be obtained as a speech recognition result to be used with the example screen analysis described above with reference to FIG. 3. The electronic device may verify that input items include a name, a phone number, and an address, and positions and/or an order of the input items through the screen analysis described above, and verify that expressions indicating the input items to be filled in are included in the speech recognition result even when the input items are not directly mentioned in the speech recognition result. In an example, the electronic device may extract one or more words following each expression as a text token from the speech recognition result, and tag the corresponding input item with the extracted text token.

For example, the electronic device may extract one or more words ○○○ 520 following an expression "the first one" 510 indicating an input item as a text token, and tag the input item "name" (e.g., the input item "name" 310) indicated by the expression "the first one" 510 therewith. In an example, the electronic device may verify that an input item positioned on the left top, among the input items included in the screen, is "name" based on the positions and/or the order of the input items, and thus identify the input item indicated by the expression "the first one" 510. The electronic device may extract ○○○ 520 positioned between the expressions "the first one" 510 and "the right of that" 530 indicating input items as a text token.

Further, the electronic device may extract one or more words ΔΔΔ540 following the expression "the right of that" 530 indicating an input item, and tag an input item "phone number" (e.g., the input item "phone number" 320) indicated by the expression "the right of that" 530 therewith. In an example, the electronic device may verify that the input item "phone number" is positioned on the right side of the input item "name" based on the positions and/or the order of the input items, and thus identify the input item indicated by the expression "the right of that" 530. Likewise, the electronic device may extract ☐☐☐ 560 and tag an input item "address" (e.g., the input item "address" 330) indicated by an expression "the one under that" 550 therewith. In an example, the electronic device may verify that the input item "address" is positioned under the input item "phone number" based on the positions and/or the order of the input items, and thus identify the input item indicated by the expression "the one under that" 550.

Referring to FIG. 6, an input item may be tagged with a text token in response to the input item being identified as corresponding to any one or any combination of content, types, and an order of one or more words included in a speech recognition result.

In an example of FIG. 6, sentence data of "○○○, and ΔΔΔ, and ☐☐☐" may be obtained as a speech recognition result to be used with the example screen analysis described above with reference to FIG. 3. The electronic device may verify that input items include a name, a phone number and an address, and positions and/or an order of the input items through the screen analysis described above, and verify that the speech recognition result includes one or more words to be input into the input items even when the input items are not directly mentioned in the speech recognition result or expressions indicating the input items to be filled in are not included in the speech recognition result. In an example, the electronic device may tag a corresponding input item with a text token including the one or more words in the speech recognition result.

For example, when one or more words ○○○ 610 are composed of letters and have a general form of a personal name and/or correspond to a commonly used personal name, the electronic device may extract ○○○ 610 as a text token from the speech recognition result and tag an input item "name" (e.g., the input item "name" 310) therewith. In addition, the electronic device may tag the input item "name" positioned on the left top, among the input items, with ○○○ 610, considering the speech recognition result in which ○○○ 610 is mentioned first.

When one or more words ΔΔΔ620 are composed of numbers and have a general form of a phone number, the electronic device may extract ΔΔΔ620 as a text token from the speech recognition result and tags an input item "phone number" (e.g., the input item "phone number" 320) therewith. In addition, the electronic device may tag the input item "phone number" following the input item "name" with ΔΔΔ620, considering the speech recognition result in which ΔΔΔ620 is mentioned after ○○○ 610 with which the input item "name" is tagged.

When one or more words ☐☐☐ 630 are composed of a combination of letters and numbers and have a general form of an address, the electronic device may extract ☐☐☐ 630 as a text token from the speech recognition result and tags an input item "address" (e.g., the input item "address" 330) therewith. In addition, the electronic device may tag the input item "address" following the input item "phone number" with ☐☐☐ 630, considering the speech recognition result in which ☐☐☐ 630 is mentioned after ΔΔΔ620 with which the input item "phone number" is tagged.

In an example, when information is already input into an input item through the example processes described above with reference to FIGS. 4 through 6 or by a user through directly typing, the user may desire to change the already input information to another information. In an example, sentence data of "Change ○○○ to XXX" may be obtained from the user as a speech recognition result. The electronic device may verify that input items include a name, a phone number, and an address through the screen analysis described above, and verify information already input into each input item through text token tagging. In an example, a result of text token tagging may be stored in a memory, and the electronic device may verify information already input into each input item by referring to the text token tagging result stored in the memory.

The electronic device may recognize "○○○" as an expression mentioning information already input into an input item that the user desires to edit, and identify an input item "name" tagged with "○○○". The electronic device may extract one or more words "XXX" following "○○○" as a text token, and tag the identified input item "name" (e.g., the input item "name" 310) therewith. The text token, with which the input item "name" is tagged, may be changed from "○○○" to "XXX".

As described above, the electronic device of one or more embodiments may adaptively perform tagging in view of any one or any combination of content, types, and an order of one or more words included in a speech recognition result.

An example in which an input item is mentioned in the speech recognition result, an example in which an expression related to an input item (for example, an expression indicating an input item or an expression mentioning information already input into an input item) is included in the speech recognition result, and an example in which an input item corresponding to any one or any combination of content, types, and an order of one or more words included in the speech recognition result is identified, have been described separately. However, another example includes any combination of these examples represented in a single speech recognition result, wherein the above description is applicable thereto without limitation.

Figure 7:
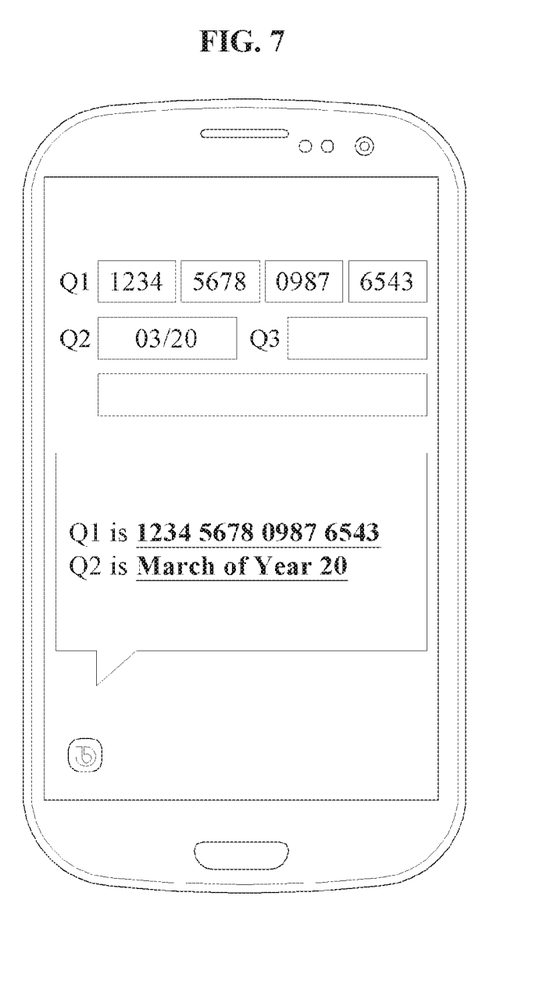
FIGS. 7 and 8 illustrate examples of displaying a speech recognition result on a screen of an electronic device.
Figure 8:
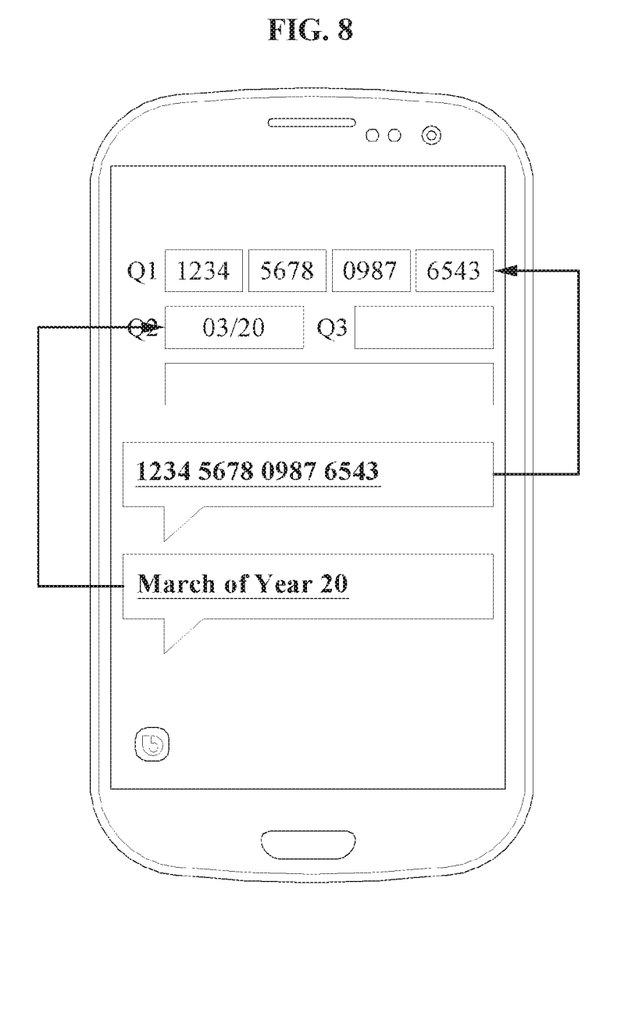

FIGS. 7 and 8 illustrate examples of displaying a speech recognition result on a screen of an electronic device.

Referring to FIG. 7, entire sentence data corresponding to a speech recognition result may be displayed on a screen of an electronic device. In an example, a text token input into an input item may be displayed visually differently from other displayed words or information. For example, visual effects (for example, underline, bold, and color) may be applied to the text token.

Further, FIG. 7 shows an example of inputting credit card information. When a user utters a credit card expiration date as "March of Year 20", the utterance may be converted to a predetermined format, such that "03/20" is input into an input item, which will be described further below.

Referring to FIG. 8, even when a user utters a number of times, speech recognition results may be displayed sequentially on a screen of the electronic device, and a text token input into an input item may be displayed visually differently from other displayed words or information.

Figure 9:
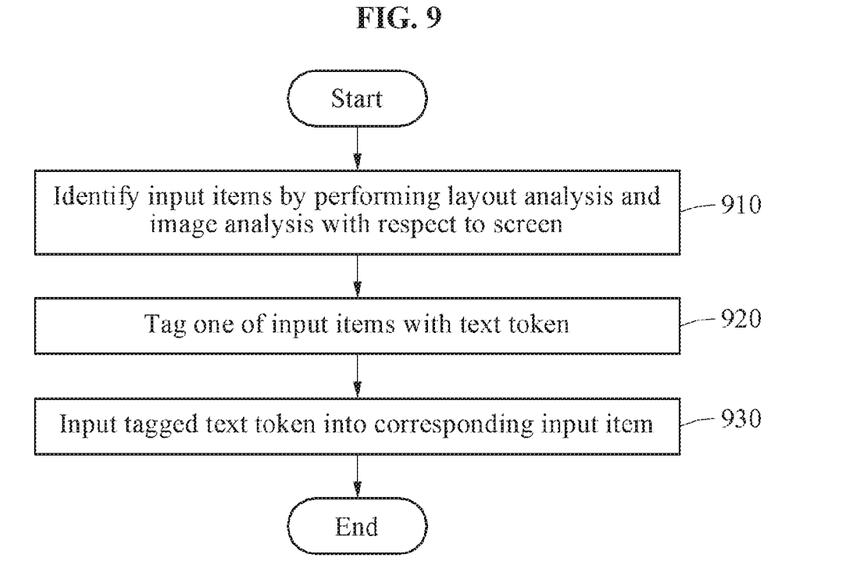
FIG. 9 illustrates an example of an operating method of an electronic device.

FIG. 9 illustrates an example of an operating method of an electronic device.

Referring to FIG. 9, an operation method of an electronic device may be performed by a processor (e.g., one or more processors) provided in the electronic device.

In operation 910, the electronic device may identify input items to be filled in on a displayed screen by performing a layout analysis and an image analysis with respect to the screen. The layout analysis may be performed based on a UI layout file defining input items included in the displayed screen. The UI layout file may be a file accessible at a platform level, the file defining any one or any combination of positions, an order, value types, and object types of the input items included in the screen at a code level. The image analysis may be performed with respect to relative positions among the input items in the displayed screen.

In operation 920, the electronic device may tag one of the input items with a text token extracted from a speech recognition result with respect to a speech signal of a user. The electronic device may extract the text token from the speech recognition result and tag one of the input items with the extracted text token, based on any one or any combination of (1) whether one of the input items is mentioned in the speech recognition result, (2) whether an expression indicating an input item to be filled in by the user is included in the speech recognition result, and (3) any one or any combination of content, a type, and an order of the speech recognition result.

In operation 930, the electronic device may input the tagged text token into the corresponding input item. In response to a format of the tagged text token being inappropriate for the corresponding input item, the electronic device may convert the tagged text token to a predetermined appropriate format and input the text token of the predetermined format into the corresponding input item.

For example, when an input item to be filled in with numbers is tagged with a text token composed of numerals of the Sino-Korean system (for example, il, i, sam, etc.), numerals of the native Korean system (for example, hana, dul, set, etc.), or a combination thereof, the electronic device may convert those numerals into Arabic numerals and input the Arabic numerals into the input item. In another example, when an input item requiring a form of "a two-digit number indicating a month/a two-digit number indicating a year" is tagged with a text token "March of Year 2020" or "March of Year 20", the electronic device may convert the text token to "03/20" and input the same into the input item. In still another example, with respect to an input item for which at least one of predetermined candidates is selected, like the input item "Option1" 350 or "Option2" 360 of FIG. 3, an input of selecting at least one candidate matching the tagged text token or with a similarity exceeding a predetermined threshold similarity may be performed. As descried above, an utterance of a user may be converted to a format appropriate for an input item and input into the input item, whereby more intuitive and practical voice assistant is provided. For example, a typical electronic device may input a text token into a displayed input item only when a single input item is displayed, or only when the input item is selected from a plurality of displayed input items. In contrast, the electronic device of one or more embodiments of the present disclosure may advantageously identify a plurality of displayed input items and tag the plurality of input items with respective text tokens extracted from a single speech recognition result. Accordingly, the electronic device of one or more embodiments of the present disclosure may provide a more intuitive and practical voice assistant to a user, as the user need not select each individual displayed input item and input respective speech signals to be converted into respective text tokens to be input, as in the typical electronic device. Instead, using the electronic device of one or more embodiments of the present disclosure, the user may intuitively and conveniently input a single speech signal the user intends to be used to populate a plurality of different displayed input items, and the device of one or more embodiments may advantageously input a plurality of text tokens extracted from a speech recognition result of the single speech signal into respectively corresponding input items.

The description provided through FIGS. 1 through 8 applies to the operations of FIG. 9, and thus duplicated description will be omitted for conciseness.

Figure 10:
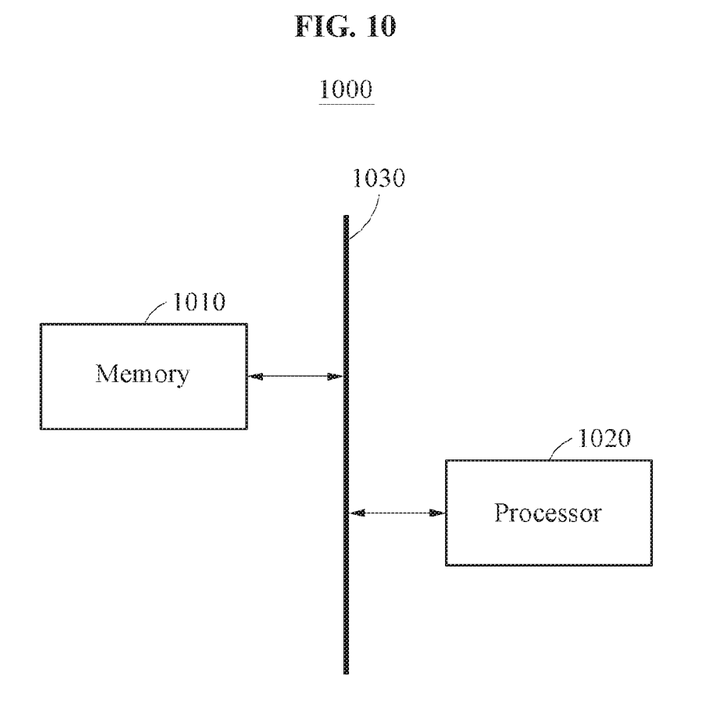
FIG. 10 illustrates an example of an electronic device.

FIG. 10 illustrates an example of an electronic device.

Referring to FIG. 10, an electronic device 1000 may include a memory 1010 and a processor 1020 (e.g., one or more processors). The memory 1010 and the processor 1020 may communicate with each other through a bus 1030. In an example, the electronic device 1000 may correspond to the electronic device 110 described above with reference to FIG. 1.

The memory 1010 may include computer-readable instructions. When an instruction stored in the memory 1010 is executed by the processor 1020, the processor 1020 may be configured to perform the operations described above. The memory 1010 may be a volatile memory or a non-volatile memory.

The processor 1020 may be a device configured to execute instructions or programs, or control the electronic device 1000, and the electronic device 1000 may be (and the processor 1020 may be implemented as a part of) any one of various computing devices, for example, a mobile phone, a smart phone, a personal digital assistant (PDA), a tablet computer, a laptop computer, and a computing device such as a personal computer (PC), a tablet computer or a netbook. The processor 1020 may identify input items to be filled in on a displayed screen by performing a layout analysis and an image analysis with respect to the screen, tag one of the input items with a text token extracted from a speech recognition result with respect to a speech signal of a user, and input the tagged text token into the corresponding input item.

The electronic device 1000 may provide a UX which enables a user to easily input a variety of information with speech, without inconveniently using a keyboard, through the operations described above.

In addition, the operations described above may be performed by the electronic device 1000.

The electronic devices, electronic device 110, electronic device 1000, memories, memory 1010, processors, processor 1020, and other apparatuses, modules, devices, and other components described herein with respect to FIGS. 1-10 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented electronic device input method, comprising:
    identifying input items configured to receive information on a displayed screen, by performing either one or both of a layout analysis and an image analysis with respect to the screen;
    extracting a text token from a speech recognition result of a speech signal based on a result of either one or both of the layout analysis and the image analysis;
    tagging one of the input items with the extracted text token; and
    inputting the tagged text token into the one of the input items.

2. The method of claim 1, wherein the layout analysis is performed based on a user interface (UI) layout file defining the input items on the displayed screen.

3. The method of claim 2, wherein
the UI layout file is a file accessible at a platform level, and
the file defines any one or any combination of any two or more of positions, an order, value types, and object types of the input items included in the screen at a code level.

4. The method of claim 1, wherein the image analysis is performed with respect to relative positions among the input items in the displayed screen.

5. The method of claim 1, wherein the either one or both of the extracting and the tagging is based on any one or any combination of any two or more of:
whether the one of the input items is mentioned in the speech recognition result;
whether an expression indicating the one of the input items is to be filled in by the user is included in the speech recognition result; and
any one or any combination of any two or more of content, a type, and an order of the speech recognition result.

6. The method of claim 5, wherein, in response to the speech recognition result mentioning the one of the input items:
the extracting comprises extracting, from the speech recognition result, one or more words following the one of the input items as the text token; and
the tagging comprises tagging the one of the input items with the extracted text token.

7. The method of claim 5, wherein, in response to the speech recognition result including an expression related to the one of the input items:
the extracting comprises extracting, from the speech recognition result, one or more words following the expression as the text token; and
the tagging comprises tagging the one of the input items with the extracted text token.

8. The method of claim 7, wherein the expression related to the one of the input items comprises either one or both of an expression indicating the one of the input items and an expression mentioning information previously input into the one of the input items.

9. The method of claim 5, wherein the tagging comprises:
identifying, as the one of the input items, an input item corresponding to any one or any combination of any two or more of content, types, and an order of one or more words included in the speech recognition result; and
tagging the one of the input items with the text token, the text token including the one or more words.

10. The method of claim 1, wherein the inputting comprises, in response to a format of the text token not corresponding to a format of the one of the input items, converting the text token to the format of the one of the input items and inputting the text token into the one of the input items.

11. The method of claim 1, further comprising displaying the speech recognition result on the screen.

12. The method of claim 11, wherein one or more words extracted as the text token from the speech recognition result are displayed on the screen in a format visually different than a format of the displayed speech recognition result.

13. The method of claim 1, further comprising receiving an instruction to call a speech recognition from a user, wherein the speech signal is of the user.

14. A non-transitory computer-readable storage medium storing instructions that, when executed by one or more processors, configure the one or more processors to perform the method of claim 1.

15. An electronic device, comprising:
one or more processors configured to:
identify input items configured to receive information on a displayed screen, by performing either one or both of a layout analysis and an image analysis with respect to the screen,
extract a text token from a speech recognition result of a speech signal based on a result of either one or both of the layout analysis and the image analysis,
tag one of the input items with the extracted text token, and
input the tagged text token into the one of the input items.

16. The device of claim 15, wherein either one or both of the extracting and the tagging is based on any one or any combination of any two or more of:
whether the one of the input items is mentioned in the speech recognition result;
whether an expression indicating the one of the input items is to be filled in by the user is included in the speech recognition result; and
any one or any combination of any two or more of content, a type, and an order of the speech recognition result.

17. The device of claim 16, wherein the one or more processors are configured to, in response to the speech recognition result mentioning one of the input items:
for the extracting, extract, from the speech recognition result, one or more words following the one of the input items as the text token; and
for the tagging, tag the one of the input items with the extracted text token.

18. The device of claim 16, wherein the one or more processors are configured to, in response to the speech recognition result including an expression related to the one of the input items:
for the extracting, extract, from the speech recognition result, one or more words following the expression as the text token, and
for the tagging, tag the one of the input items with the extracted text token.

19. The device of claim 16, wherein the one or more processors are configured to:
identify, as the one of the input items, an input item corresponding to any one or any combination of any two or more of content, types, and an order of one or more words included in the speech recognition result; and
tag the one of the input items with the text token, the text token including the one or more words.

20. The device of claim 15, wherein the layout analysis is performed based on a user interface (UI) layout file defining the input items on the displayed screen.

21. The device of claim 15, wherein the device is any one or any combination of any two or more of a mobile phone, a smart phone, a personal digital assistant (PDA), a tablet computer, a laptop computer, a personal computer (PC), a tablet computer, and a netbook.

22. The device of claim 15, further comprising a memory storing instructions that, when executed by the one or more processors, configure the one or more processors to perform the identifying of the input items, the tagging of the one of the input items, and the inputting of the tagged text token.

23. A processor-implemented electronic device input method, comprising:
- identifying an input item configured to receive input information in a user interface display;
- extracting a corresponding text token from a speech recognition result based on the identified input item;
- tagging the input item with the extracted text token; and
- inputting the tagged text token into the input item.

24. The method of claim 23, wherein
- the identifying comprises identifying a plurality of input items configured to receive input information in the user interface display,
- the tagging comprises tagging each of the plurality of input items with a corresponding text token from among a plurality of text tokens of the speech recognition result, and
- the inputting comprises inputting each of the tagged text tokens into the respectively corresponding input items.

25. The method of claim, 23 wherein
the identifying of the input item comprises identifying a category of the input information to be received by the input item, and
the tagging of the input item comprises tagging the input item with the text token in response to determining that an expression of the speech recognition result adjacent to the text token corresponds to the category of the input information to be received by the input item.

26. The method of claim, 23 wherein
the identifying of the input item comprises identifying either one or both of a hierarchical order and a directional position of the input item with respect to another item of the user interface display, and
the tagging of the input item comprises tagging the input item with the text token in response to determining that an expression of the speech recognition result adjacent to the text token corresponds to the either one or both of the hierarchical order and the directional position.

27. The method of claim, 23 wherein
the identifying of the input item comprises identifying an input format of the input item, and
the tagging of the input item comprises tagging the input item with the text token in response to determining that a format of the text token corresponds to the input format of the input item.

\* \* \* \* \*